United States Patent [19]

Pressley

[11] Patent Number: 4,475,027

[45] Date of Patent: Oct. 2, 1984

[54] OPTICAL BEAM HOMOGENIZER

[75] Inventor: Robert J. Pressley, Cupertino, Calif.

[73] Assignee: Allied Corporation, Morris Township, Morris County, N.J.

[21] Appl. No.: 322,124

[22] Filed: Nov. 17, 1981

[51] Int. Cl.³ .......................................... B23K 27/00
[52] U.S. Cl. ...................... 219/121 L; 219/121 LM; 219/121 LP; 350/294; 350/433
[58] Field of Search ..... 219/121 L, 171 LM, 121 LE, 219/121 LF, 121 LP, 121 LQ, 121 LR, 121 LW; 350/294, 433

[56] References Cited

U.S. PATENT DOCUMENTS

| | | | |
|---|---|---|---|
| 2,156,911 | 5/1939 | Brown | 350/294 |
| 2,890,622 | 6/1959 | Wallin | 350/433 X |
| 3,705,758 | 12/1972 | Haskal | 219/121 LR X |
| 3,848,104 | 11/1974 | Locke | 219/121 LA X |
| 3,877,777 | 4/1975 | Glenn, Jr. | 350/7 |
| 4,030,816 | 6/1977 | Belke et al. | 350/264 |
| 4,059,461 | 11/1977 | Fan et al. | 148/1.5 |
| 4,148,564 | 4/1979 | Devin et al. | 350/292 |
| 4,195,913 | 4/1980 | Dourte et al. | 350/292 |
| 4,198,246 | 4/1980 | Wu | 148/1.5 |
| 4,289,380 | 9/1981 | Tucker | 350/292 |
| 4,316,074 | 2/1982 | Daly | 219/121 L |

FOREIGN PATENT DOCUMENTS 2012065  7/1979  United Kingdom .
2044948  10/1980  United Kingdom .

OTHER PUBLICATIONS

R. A. Kaplan et al., *Electronics*, Feb. 28, 1980, pp. 137–142, "Laser Cold Processing Takes the Heat Off Semiconductors".

S. L. Ream, *Laser Focus*, Nov. 1979, pp. 68, 70 and 71, "A Convex Beam Integrator".

*Primary Examiner*—C. L. Albritton
*Attorney, Agent, or Firm*—James Riesenfeld; Gerhard H. Fuchs

[57] ABSTRACT

An optical beam homogenizer divides and redirects an incident beam to provide uniform irradiation to a plane surface. The beam homogenizer is particularly useful in an apparatus and method for uniform laser irradiation of materials. The apparatus comprises a laser, a beam homogenizer, and a support for the material being irradiated. Depending on the system parameters, the apparatus is useful for metal hardening, semiconductor annealing, or other materials processing applications.

18 Claims, 9 Drawing Figures

OPTICAL BEAM HOMOGENIZER

BACKGROUND OF THE INVENTION

1. Field of the Invention

This invention relates to an optical device for providing uniform irradiation to a plane surface. The device is particularly useful in an apparatus for laser treatment of metals and semiconductors.

2. Description of the Prior Art

A broadly wavelength-tunable alexandrite laser was disclosed by Walling et al., in U.S. Pat. No. 4,272,733. The Patent suggested applications for the alexandrite laser such as welding, nuclear fusion, isotope separation, photochemistry, etc.

In general, lasers have been applied to many materials processing operations, including welding and soldering of metals, cutting and marking of both metals and nonmetals, and annealing of semiconductors. The latter application includes liquid and solid phase epitaxy, crystallinity growth, activation and diffusion of dopants, and elimination of lattice defects. The alternative to laser-annealing of semiconductors, furnace-annealing, requires heating and semiconductors at temperatures between 500° and 1000° for prolonged periods, which is neither as convenient nor as effective.

Laser-annealing of semiconductors, particularly silicon, has been disclosed in several technical publications as well as patents. Kaplan et al. in Electronics, Feb. 28, 1980, p. 137 summarize semiconductor annealer parameters and results achieved with various laser sources. Among the patents, U.S. Pat. Nos. 4,181,538 and 4,198,246 disclose novel methods for laser-treating silicon and include a great many references to early patents and publications on the subject.

The apparatuses used in laser-annealing of semiconductors have included both ruby and Nd:YAG lasers both pulsed and CW. Typically, the laser beam is focused onto the surface and scanned across the area to be treated. A simple laser-annealing apparatus was shown by Fan et al. in FIG. 1 of their U.S. Pat. No. 4,059,461. Although the shape and size of the spot on their sample is determined simply by a focusing lens, they make reference to alternatives such as "beam expanders, cylindrical lenses, mirrors, or other optical or mechanical elements."

Sharp, U.K. patent application GB No. 2,044,948 A, recognizing the disadvantage of non-uniform distribution of power in a laser beam used for heat treating a steel workpiece, disclosed a hollow beam shaper open at both ends and having internal reflective surfaces. A laser beam, after passing through the beam shaper, produces a rectangular area of substantially uniform power density on the surface of the workpiece.

Several laser beam shaping techniques were described by S. L. Ream in Laser Focus, Nov., 1979, p. 68. Among the optical devices he describes for use with $CO_2$ lasers in hardening of steels are convex and concave beam integrators that consist of copper blocks having a large number of carefully positioned flat facets either turned in or attached to them. The beam integrator yields a flattened laser output profile, which corresponds to enhanced uniformity of laser intensity on the work surface. He includes semiconductor annealing among potential application areas for beam integrators.

Among the optical integrators described by Ream are the types disclosed by Dourte et al., in U.S. Pat. No. 4,195,913. They accomplish optical integration by the use of a plurality of reflective segments. These segments are positioned to divide a beam into a plurality of parts and reflect the various parts so that they intersect at a target. Among the configurations disclosed for the reflective segments is one in which the segments are positioned tangent to an imaginary cylindrical surface to produce a long narrow rectangular area of optical integration. Fabrication of the integrators disclosed by Dourte et al. is difficult and expensive, and beam uniformity is reduced by discontinuity and diffraction at the many segment edges.

Orthogonal cylindrical lenses for successive one-dimensional beam expansion were disclosed by Glenn, in U.S. Pat. No. 3,877,777.

Arrays of rectangular elementary mirrors for concentrating solar radiation were disclosed by Devin et al. in U.S. Pat. No. 4,148,564. Among the configurations they disclose is an array of rectangular plane mirrors arranged along a portion of a cylinder.

SUMMARY OF THE INVENTION

In accordance with the present invention, an optical beam homogenizer is provided. The beam homogenizer comprises two segmented cylindrical optical elements, mounted with their cylindrical axes substantially at right angles to each other and oriented so that the elements divide a light beam incident on the first element into a plurality of parts and redirect the parts to intersect to form an area of substantially uniform power density at a predetermined distance from the second element. Compared with those of the prior art, the beam homogenizer of the present invention provides the advantages of simpler fabrication and greater beam uniformity with less loss.

As used in this specification and the appended claims, "light" includes electromagnetic radiation throughout the range from ultraviolet to infrared. The term "homogenizer" refers to an optical device that redirects radiation incident on it in such a way as to increase the power density uniformity of the radiation.

The beam homogenizer of this invention is particularly suitable for use in an apparatus for exposing material to a laser beam having a substantially uniform power density over a predetermined area. The apparatus comprises, in combination, a laser whose output beam is directed to the beam homogenizer to divide and redirect the laser beam, and means for supporting the material. An alexandrite laser is a preferred source.

In operation, the apparatus provides a method of radiation-treating a material. The method comprises the steps of generating a laser beam, homogenizing the laser beam to provide a beam of substantially uniform power density over an area oriented perpendicular to the beam direction at the surface of the material, and contacting the material with the homogenized laser beam.

Compared with laser-treatment apparatus of the prior art, the alexandrite laser system provides a wavelength range that is particularly well suited for annealing silicon. The system also has advantages of long pulse duration and high average power. In addition, the uniform power density incident on the material permits uniform treatment across an entire surface.

DETAILED DESCRIPTION OF THE INVENTION

Uniform irradiation over an area is necessary or desirable in a variety of applications, such as annealing semiconductors, heat treating metals, vaporizing materials for vacuum deposition, and concentrating solar energy for electric power generation. The beam homogenizer of the present invention provides uniform irradiation using two segmented cylindrical optical elements. The first element receives an incident beam, divides the beam into a plurality of parts, and redirects the beam toward the second element. The second element, whose cylindrical axis is perpendicular to that of the first element, again divides the beam into parts and redirects the parts to intersect on an area that is perpendicular to the beam direction.

The use of lasers in materials processing applications has been limited not only by an inability to provide uniform irradiation, but also by the shortcomings of lasers emitting in the deep red and near infrared region of the spectrum, which are particularly useful for semiconductor processing. An embodiment of the present invention addresses these problems by using an alexandrite laser to generate a beam whose wavelength may be anywhere in the range from about 700 nm to about 830 nm. The laser beam is first directed to a homogenizer, which divides and redirects the beam, and is then incident on the work material.

Figure 1:
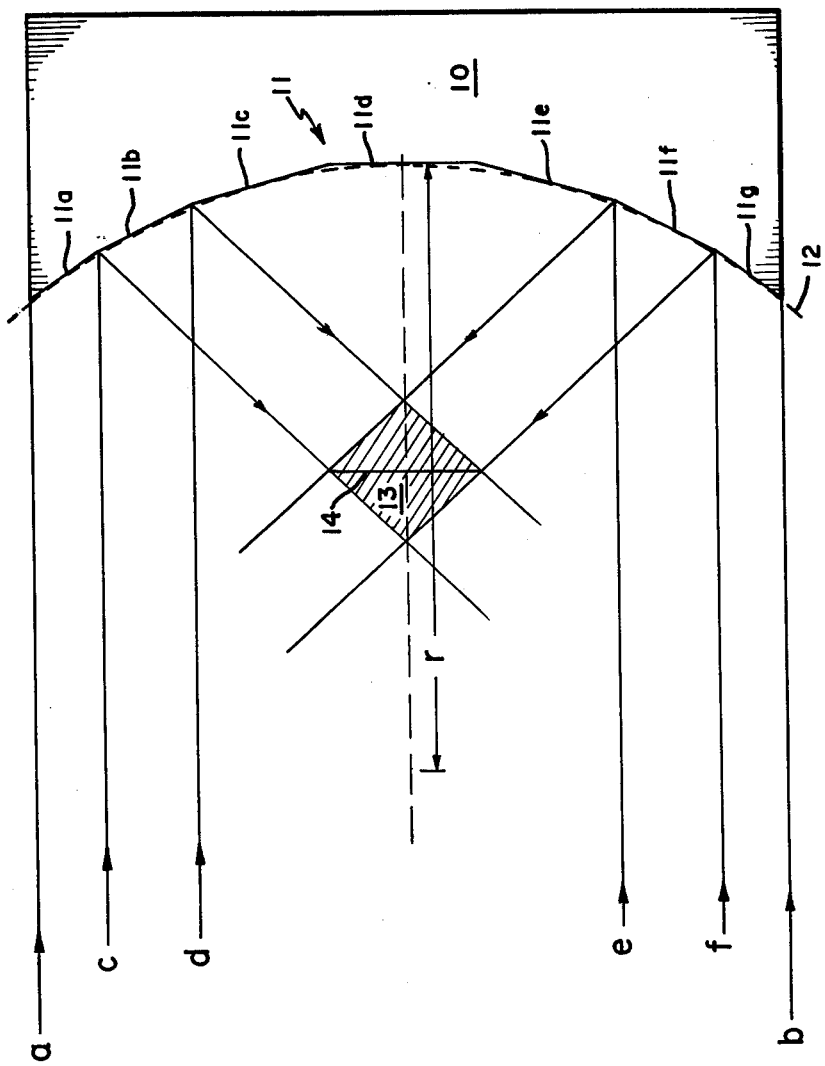
FIG. 1 is a side view of an element of a reflective beam homogenizer of the present invention.

In one embodiment of the optical beam homogenizer of the present invention, the optical elements each comprise a plurality of reflective segments. The principle of operation of a reflective beam homogenizer can be understood with reference to FIG. 1. FIG. 1 depicts a side view of a beam homogenizer element 10, on which is incident a collimated light beam, defined by parallel rays a and b, parallel to the beam direction. We assume throughout that all the rays are paraxial; i.e., they make very small angles with the axis and lie close to the axis throughout the distance from object to image. The beam may, but need not, have a circular cross section in a plane normal to the beam direction. As is clarified in the perspective view shown in FIG. 2, the reflective front surface 11 of homogenizer element 10 comprises seven rectangular segments 11a–11g. The segments are each tangent to an imaginary circular cylinder 12 of radius r. In general, the beam intensity is not uniform over its extent. However, the intensity variations over parts of the beam, for example cd and ef, are less than the variation over the larger distance ab. Reflective segments 11b and 11f redirect beam segments cd and ef, respectively, to intersect over a volume in space that is normal to the plane of the paper and whose projection on the plane of the paper is shown as lined area 13. Similarly, each reflective segment, 11a, 11c, . . . 11g, reflects the part of the beam incident on it to intersect the other reflected beams in rectangular area 14, located a distance r/2 from central segment 11d and having the same size as central segment 11d.

The resultant intensity variation over the width (i.e., smaller dimension) of irradiated area 14 is far less than the variation over the incident beam ab. A greater number of reflective segments reduces the intensity variation; however, it also reduces the irradiated area. Furthermore, interference and diffraction effects, which are ignored throughout, can introduce significant nonuniformity if segment width becomes very small. In a practical situation, an application will dictate a minimum permissible irradiated area and a maximum permissible intensity variation, which, in turn, will dictate the dimensions of the element and the number and size of the segments.

In order that the reflected beam from each segment provide the same image size, segment width must decrease away from central segment 11d. It can be shown that a segment whose normal makes an angle $\theta$ with the axis should have a width of $w \cos 2\theta/\cos \theta$, where w is the width of the central segment. However, for paraxial rays, the variation in width may be negligible and, depending on the uniformity requirements, it may be expedient to make all the segments of equal width.

For simplicity of understanding, beam ab is shown in FIG. 1 as being normal to central segment 11d. In practice, however, irradiated area 14 typically coincides with a part of the work surface of a target being irradiated. The target then would block the central portion of the beam. In practice, therefore, the incident beam is not normal to the central segment.

Figure 2:
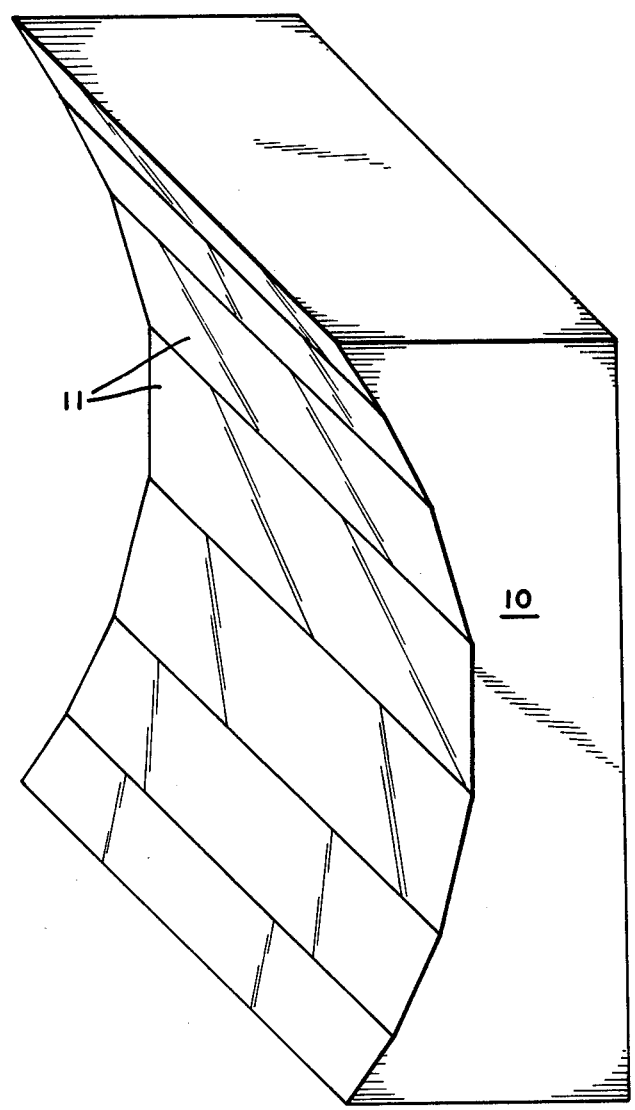
FIG. 2 is a perspective view of the element of FIG. 1.

In FIGS. 1 and 2, the element 10 is shown to include seven rectangular reflective segments 11; in practice, there would generally be at least that many segments. Reflective segments 11 are shown to be an integral part of element 10. Alternatively the segments can be mirrors adhered to a cylindrical concave surface. In any case, reflective surfaces 11 are coated with a material or materials that are durable and that have high reflectance in the wavelength range of intended use. These materials, well known in the optical coating art, include various metals, such as silver or gold, with a transparent protective coating, if necessary.

Figure 3:
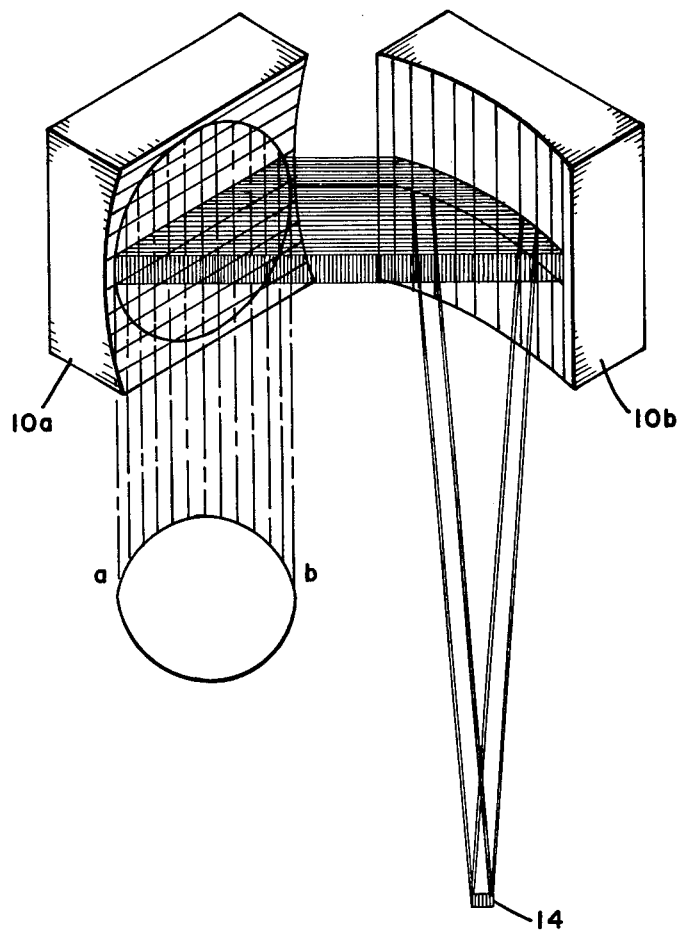
FIG. 3 depicts a reflective beam homogenizer.

FIG. 3 shows both elements of a reflective beam homogenizer. The second element 10b is positioned with its axis substantially at right angles to that of the first element 10a. An incident light beam ab has a generally circular cross section in a plane normal to the beam direction. Segmented reflective elements 10a and 10b redirect and homogenize the beam so that it is incident on a planar work material in an area 14 of substantially uniform intensity. In a typical embodiment of the present invention, mirrors 10a and 10b are each formed of a series of reflective segments about 3 mm wide × 300 mm long. Element 10a has a cylindrical focal length of about 450 mm and element 10b a cylindrical focal length of about 300 mm, the difference corresponding to their separation along the beam axis. The resultant beam area 14 is a square 3 mm on a side.

Figure 4:
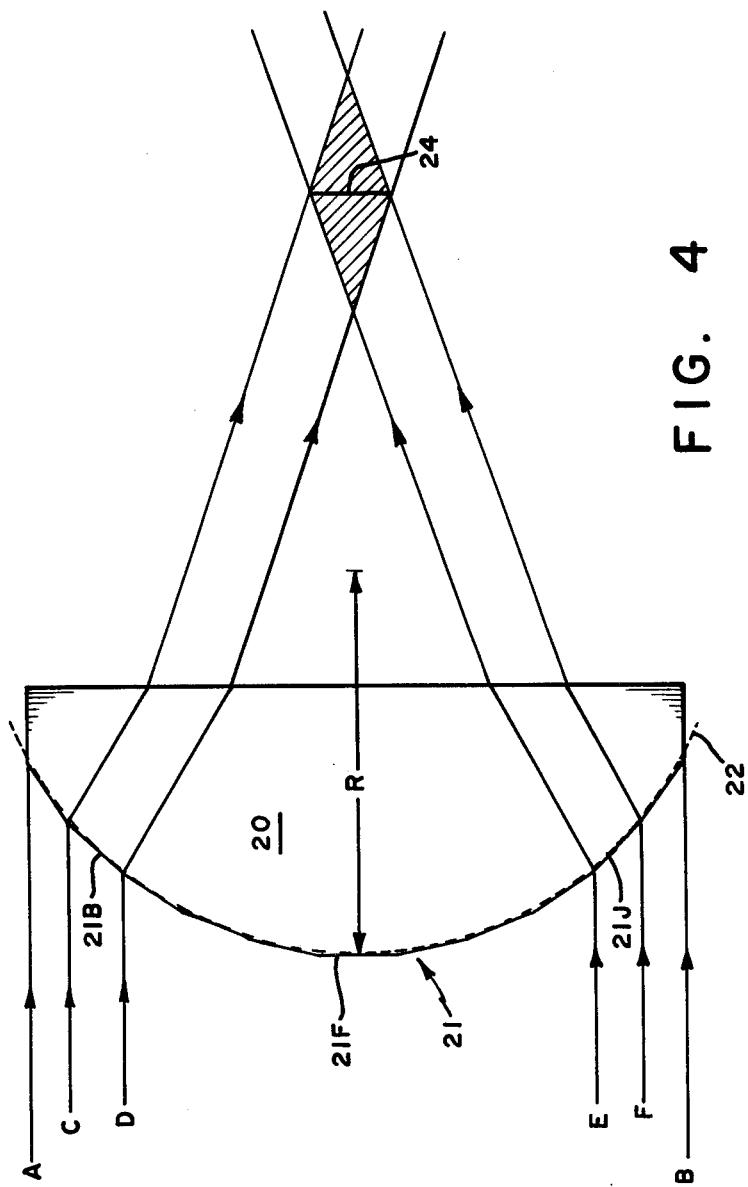
FIG. 4 is a side view of an element of a refractive beam homogenizer.

In an alternative embodiment of a beam homogenizer, the elements are transparent. A side view of an element 20 of such a homogenizer is shown in FIG. 4. In analogy to the reflective beam homogenizer element shown in FIG. 1, an incident parallel beam AB, of generally circular cross section, is incident on refractive beam homogenizer element 20, which comprises 11 substantially rectangular segments 21A–21K. The segments are each tangent to an imaginary cylinder 22, having a radius R. As before, the analysis is limited to paraxial rays. FIG. 4 depicts parts CD and EF of beam AB redirected by segments 21B and 21J, respectively. In fact, each segment redirects a part of beam AB, and all the resultant beams are incident on a rectangular area 24, which extends normal to the plane of the paper and is the same size as central segment 21F. Depending on the index of refraction of element 20, the distance from area 24 to central segment 21F may be about 2R.

Figure 5:
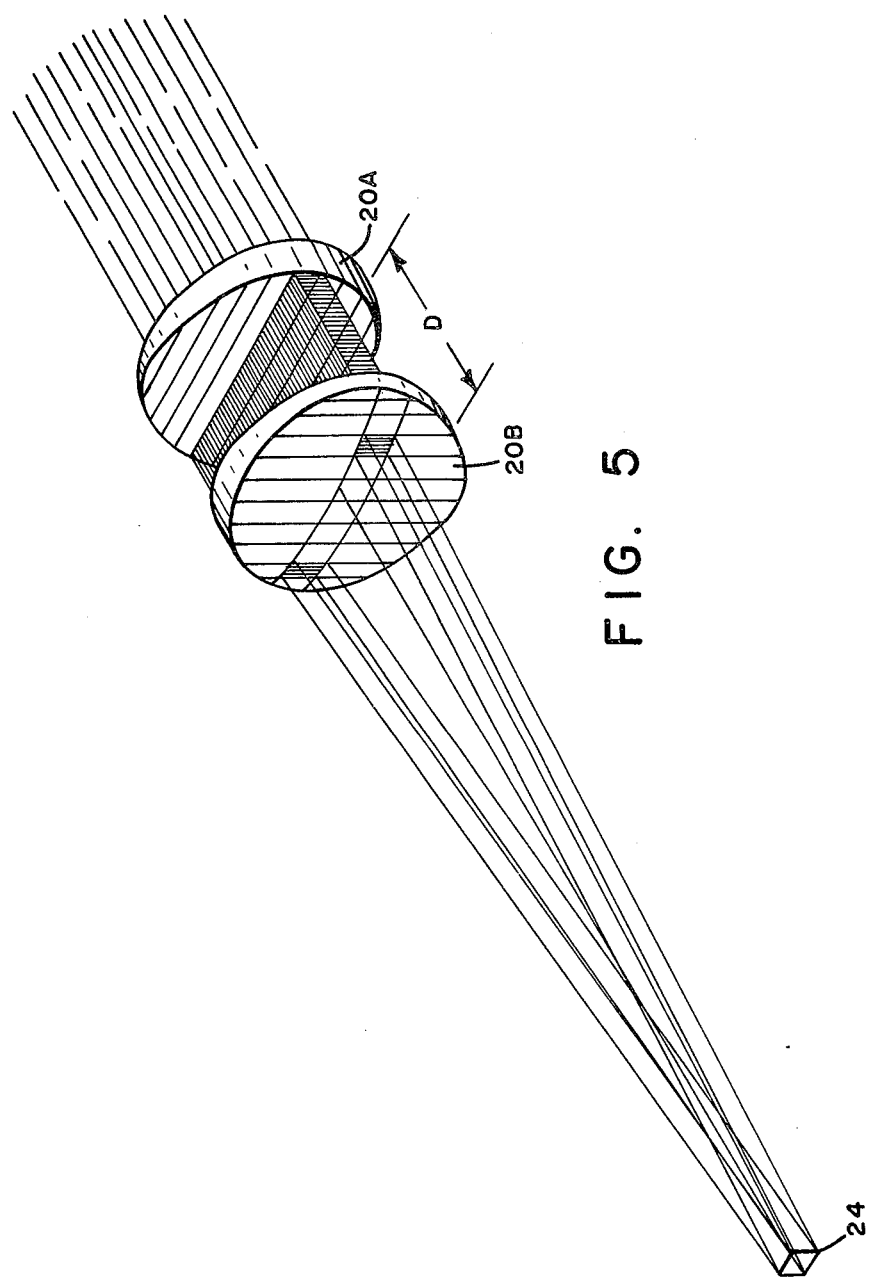
FIG. 5 depicts a refractive beam homogenizer.

FIG. 5 shows a perspective view of both elements of a refractive beam homogenizer. The long direction of the rectangular segments of element 20A is at right angles to the long direction of the segments of element 20B. The elements are separated by a distance D, with element 20B closer to target 24. The imaginary cylinder to which the segments of element 20B are tangent has a focal length which is shorter by the length D than the corresponding cylinder of element 20A.

Standard optical materials are suitable for the elements of the refractive beam homogenizer, with low absorption of the particular light to be used a primary concern. If desirable or necessary, antireflection coatings may be applied to the elements.

Refractive beam homogenizers have two drawbacks compared with reflective. Depending on the wavelength of the light source and absorption characteristics of the homogenizer material, there may be substantial absorption and consequently reduced intensity. In addition, if the light source is not monochromatic, chromatic aberration reduces beam uniformity on the target.

The main advantage of a refractive beam homogenizer is the fact that the target may be on the axis, which reduces optical aberrations and permits simpler arrangement of the homogenizer and target. When, in addition, an alexandrite laser is the light source, ordinary optical glass is adequate as a homogenizer material and chromatic aberration is, of course, not a problem.

An alternative to beam homogenizers comprising two reflective or two transparent elements is one comprising an element of each type. Such a combination homogenizer would then have a combination of the advantages and disadvantages of the two types of elements.

In applications such as materials processing, a beam is typically scanned over an area much larger than the beam. In those applications, the beam homogenizer elements are preferably selected, mounted, and oriented in such a way that they form an area of uniform irradiation that is substantially square. A square area of uniform irradiation generally facilitates scanning a beam over a large area and providing maximum uniformity with minimum overlap. However, if the area being scanned is elongated, i.e., substantially longer in one dimension, a beam of rectangular cross section is preferred. Such a beam may be formed simply by using rectangular segments of one width on the first element and a different width on the second.

Figure 6:
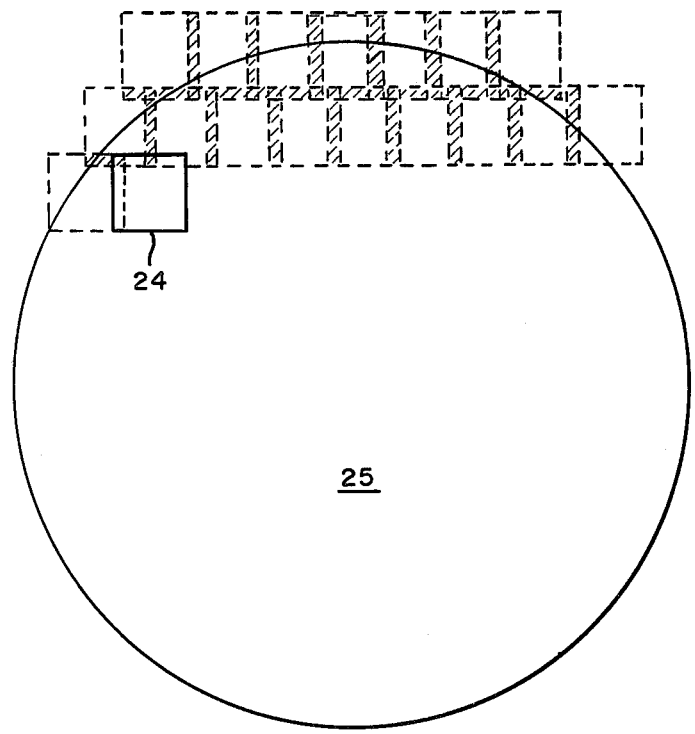
FIG. 6 depicts a scan pattern that may be used with an apparatus of the present invention.

FIG. 6 illustrates a circular workpiece 25 being scanned with a square beam 24, the dashed lines showing the areas of successive exposures, starting at the upper left. The pattern shown in FIG. 6 uses "20 percent overlap," by which is meant that each exposure repeats 20 percent of the previous exposure. Overlap serves two purposes. First, it reduces nonuniformity caused by diffraction. Second, overlap is necessary in order to cover the entire surface, because the beam is in fact not perfectly square, but has rounded edges. The degree of rounding determines the amount of overlap necessary. The minimum overlap necessary to ensure total area coverage is preferred, and 10 percent overlap has been found to be suitable using a "square" beam. Clearly, a round beam requires more overlap than a square beam.

An optical beam homogenizer is well suited for use in an apparatus for laser treatment of metals and semiconductors. The beam homogenizer permits multimode operation of the laser, with greater power output, instead of the $TEM_{oo}$ mode, which the apparatuses of the prior art were limited to. An alexandrite laser is particularly well suited for use in such an apparatus. An alexandrite laser is disclosed in U.S. Pat. No. 4,272,733, and the disclosure of that patent is incorporated herein by reference. The active material is synthetic alexandrite, which is Cr-doped $BeAl_2O_4$ having the chrysoberyl structure. The laser may be operated in either the pulsed or CW mode, pumped with either a coherent or incoherent source, and it may be Q-switched and/or modelocked. The output wavelength is continuously selectable in the range from about 700 nm to 830 nm. Alternatively, if a conventional tuning element such as a birefringent filter is incorporated in the laser, the output wavelength may be tuned to any wavelength in that range. By suitable choice of laser parameters, output power may be anywhere in the range from 0 to 70 watts. Pulse durations in the range from 1–1000 ns may be provided at frequencies up to 40 $s^{-1}$.

Preferably, the laser beam passes first to a beam expander, which may be of a conventional type, well known in the art. The beam expander enlarges and collimates the laser beam and facilitates alignment of the beam.

The laser beam is then incident on a beam homogenizer, which converts the beam to one having a substantially uniform power density over an area perpendicular to the direction of beam travel at the work surface. Here and in the description that follows, it is convenient to assume that the work surface is a plane that coincides with such an area, but that is not a requirement.

Figure 7A:
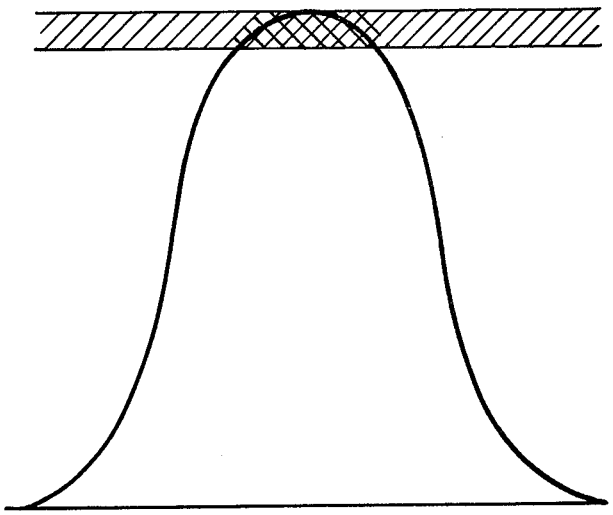
FIGS. 7a and 7b illustrate the improved uniformity of beam intensity achieved using a beam homogenizer.
Figure 7B:
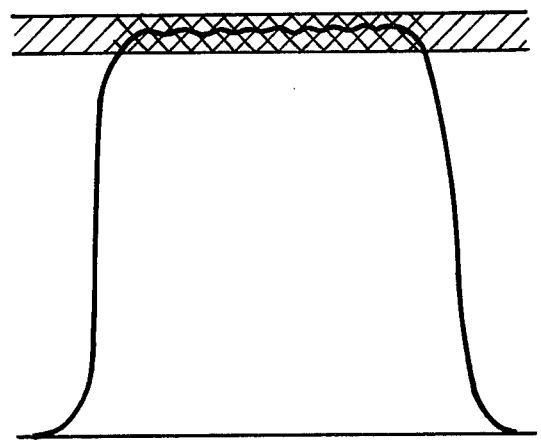

FIG. 7A depicts the Gaussian spatial intensity variation that typifies a laser beam ($TEM_{oo}$) incident on the work surface of a materials processing apparatus when no beam homogenizer is used. The lined area shows the range of fluence usable for the particular application and the crosshatching shows the spatial region over which the fluence is in the required range. FIG. 7B depicts the intensity variation when a beam homogenizer of this invention is used. Although the two graphs of beam intensity are idealized and not meant to be quantitatively accurate, it is clear that the spatial region over which appropriate fluence is provided is far greater when a beam homogenizer is used.

Preferably, the beam forms a square on the work surface, because that geometry generally makes it simpler to provide uniform irradiation of the entire work surface, provided the work surface area is substantially larger than the beam area and is not elongated. A preferred way of achieving a square beam on the work surface is to use a beam homogenizer of the type described above, comprising either reflective or refractive elements. The beam homogenizer directs the laser beam to the material being irradiated. In general, optimum treatment of the material requires a beam having substantially uniform power density over its area of incidence on the material. Each point on the material must then be exposed for the same length of time.

If, as is almost invariably the case, the material to be processed is larger than the area of the beam on the surface, the laser beam must be moved relative to the material in order to effect uniform exposure. In principle, the beam could be scanned across a stationary material. In practice, it is generally more convenient to use a support adapted to move the material in a plane substantially perpendicular to the direction of the incident beam.

Among the applications for the present laser system are laser heat treatment of metals and annealing of semiconductors. It is known that steel may be hardened by uniform heat treatment, which can be accomplished by exposure to suitable laser radiation. The parameters required for laser hardening of steel and cast iron are discussed in Guide for Materials Processing by Lasers, S. Charschan (ed.), pp. 6-2 to 6-6 and in the references on p. 6-9. The present laser system provides these parameters with the uniform exposure that the treatment requires.

Alexandrite lasers are well suited for semiconductor annealing, particularly for annealing of silicon, which strongly absorbs the wavelengths of alexandrite emission. If operated in the pulsed mode, the present system is adapted for liquid phase epitaxy (LPE), using a single pulse to melt the semiconductor surface and obtain recrystallization. LPE is best accomplished with fluence at least about 1 $J/cm^2$ but less than about 5 $J/cm^2$. Below that fluence range, there is insufficient energy to melt the surface, while above there is the risk of evaporating surface material. The energy per alexandrite laser pulse is typically in the range from 0.05 to 0.3 J. Thus, using the higher pulse energies, adequate fluence for LPE may be provided over an area as large as about 0.1 $cm^2$ or more. The large irradiation area, in turn, permits faster annealing. Controlled dopant diffusion in the liquid results in a controlled distribution in the interior to depths ranging from 0.1 to 0.5 m and deeper, depending on the energy per pulse and number of annealing passes. Furthermore, since alexandrite is a low-gain material Q-switched alexandrite lasers provide longer pulses than ruby or YAG lasers (~200 ns v. 50–100 ns), thus permitting operation at rather high pulse energy for deep processing. If the high pulse energy is delivered in shorter pulses, excessive power levels can cause vaporization of the semiconductor.

If the laser is operated in the CW mode, the beam is kept on an area for milliseconds, long enough to permit solid phase epitaxy (SPE), recrystallization without melting. Unlike LPE, dopant ions are held in position during SPE.

The Table summarizes the range of parameters that can be provided by an alexandrite system adapted for semiconductor annealing.

TABLE

| Wavelength | 700–820 nm |
|---|---|
| Average Power | 0–100 W |
| Fluence Range | 0.5–5 $J/cm^2$ |
| Pulse Frequency | 0–100 $s^{-1}$ |
| Energy per Pulse | 0–0.6 J |
| Pulse Duration | 30–200 ns |
| Beam Dimensions at Work Surface | 3 × 3 mm or larger |
| Beam Overlap | 10–20% |

Figure 8:
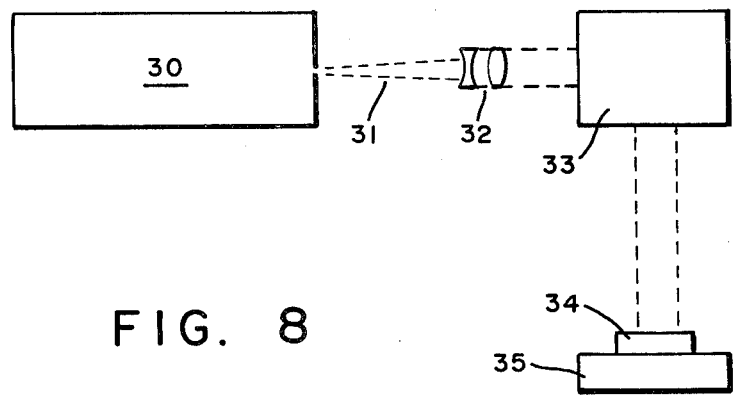
FIG. 8 is a schematic illustration of a materials-processing apparatus employing a beam homogenizer of the present invention.

FIG. 8 depicts a schematic of a laser apparatus of the present invention. Laser 30, optionally equipped with a Q-switch and/or tuning element (not shown) of conventional design well known in the art, generates a beam 31, which impinges on optional beam expander 32 and is directed to beam homogenizer 33. Beam homogenizer 33 divides the beam into parts, and the parts intersect at the surface of work material 34, which is mounted on support 35. Support 35 may include means, such as an X-Y motion system, for moving the work material 34 in a plane perpendicular to the incident beam.

I claim:

1. An optical beam homogenizer comprising two segmented cylindrical optical elements mounted with their cylindrical axes substantially at right angles to each other and oriented so that the elements divide a light beam incident on the first element into a plurality of parts and redirect the parts to intersect to form an area of substantially uniform power density at a predetermined distance from the second element.

2. The beam homogenizer of claim 1 in which the elements are selected, mounted, and oriented such that the area of substantially uniform power density is substantially square.

3. The beam homogenizer of claim 1 in which the optical elements comprise reflective segments.

4. The beam homogenizer of claim 3 in which the reflective segments are substantially rectangular, are in contact along their long dimension, and have short dimensions that decrease monotonically away from a central rectangle.

5. The beam homogenizer of claim 1 in which the optical elements comprise refractive segments.

6. An apparatus for exposing material to a laser beam having a substantially uniform power density over a predetermined area comprising, in combination:
    a laser, whose output beam is directed to
    the beam homogenizer of claim 1, 2, 3, 4 or 5 to divide and redirect the laser beam, and
    means for supporting the material.

7. The apparatus of claim 6 in which the laser is an alexandrite laser.

8. The apparatus of claim 6 in which the laser includes means for Q-switching the laser.

9. The apparatus of claim 6 in which the laser includes means for tuning the wavelength of the laser beam.

10. The apparatus of claim 6 in which the laser includes a beam expander to enlarge the spatial extent of the laser beam prior to its passing to the homogenizer.

11. The apparatus of claim 6 in which the means for supporting the material is further adapted for moving the material in a plane substantially perpendicular to the direction of the laser beam incident on the material 12. A method of radiation-treating a material comprising the steps of:
    generating a laser beam,
    homogenizing the laser beam to provide a beam with a pair of segmented optical elements to provide a beam of substantially uniform power density over an area oriented perpendicular to the beam direction at the surface of the material, and
    contacting the material with the homogenized laser beam.

13. The method of claim 12 in which the material is a semiconductor.

14. The method of claim 13 in which the semiconductor is silicon.

15. The method of claim 12 further comprising Q-switching the laser beam.

16. The method of claim 12 further comprising tuning the wavelength of the laser beam.

17. The method of claim 12 further comprising enlarging the spatial extent of the laser beam prior to homogenizing it.

18. The process of claim 12 further comprising moving the material relative to the laser beam to provide a predetermined uniform exposure.

* * * * *

UNITED STATES PATENT AND TRADEMARK OFFICE
CERTIFICATE OF CORRECTION

PATENT NO. : 4,475,027

DATED : October 2, 1984

INVENTOR(S) : Robert J. Pressley

It is certified that error appears in the above—identified patent and that said Letters Patent are hereby corrected as shown below:

Col. 8, line 48, "to provide a beam" should not appear

Signed and Sealed this

Fourteenth Day of May 1985

[SEAL]

Attest:

DONALD J. QUIGG

Attesting Officer

Acting Commissioner of Patents and Trademarks